W. A. DENNEY.
WHEEL FORMING MACHINE.
APPLICATION FILED SEPT. 4, 1915.
1,164,172.
Patented Dec. 14, 1915.
3 SHEETS—SHEET 1.
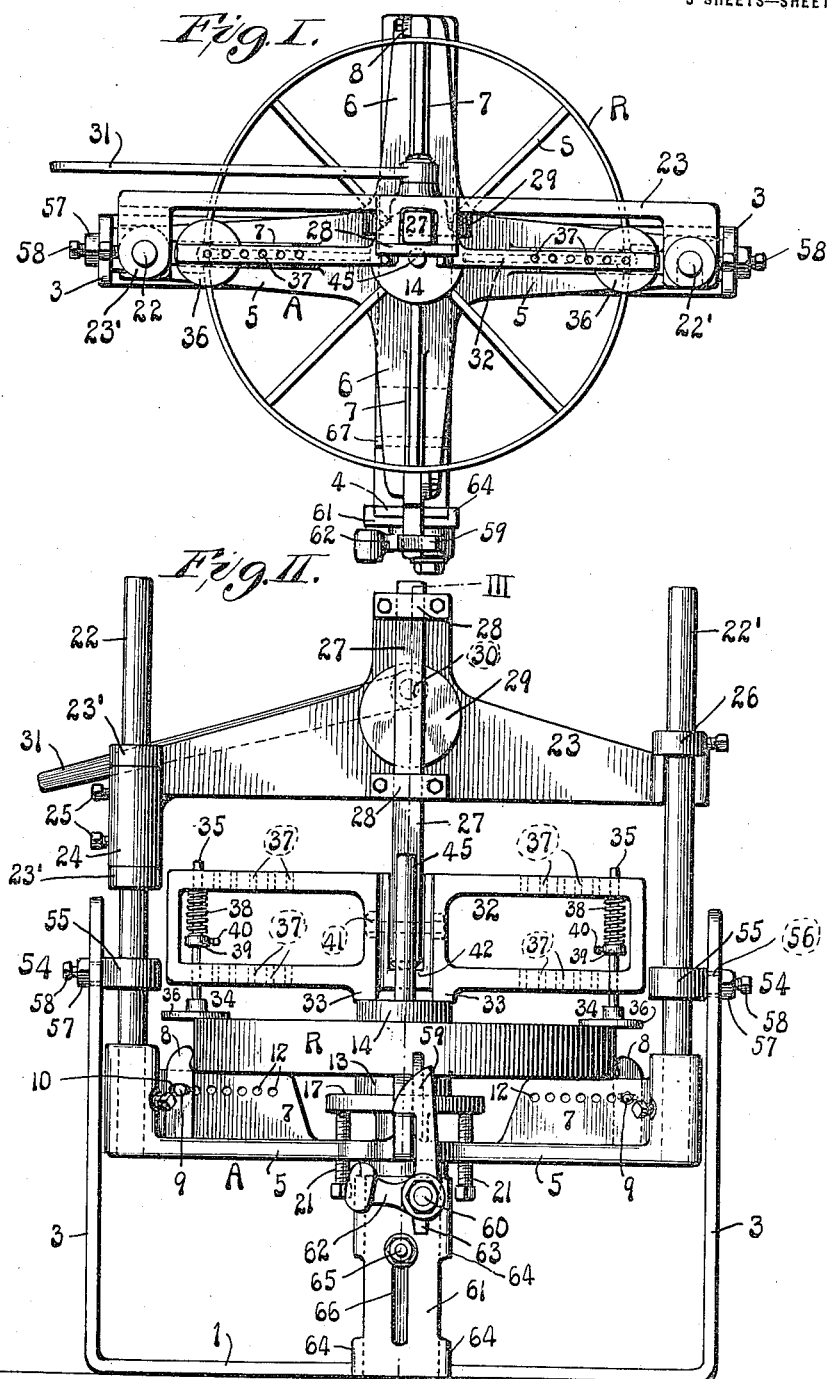

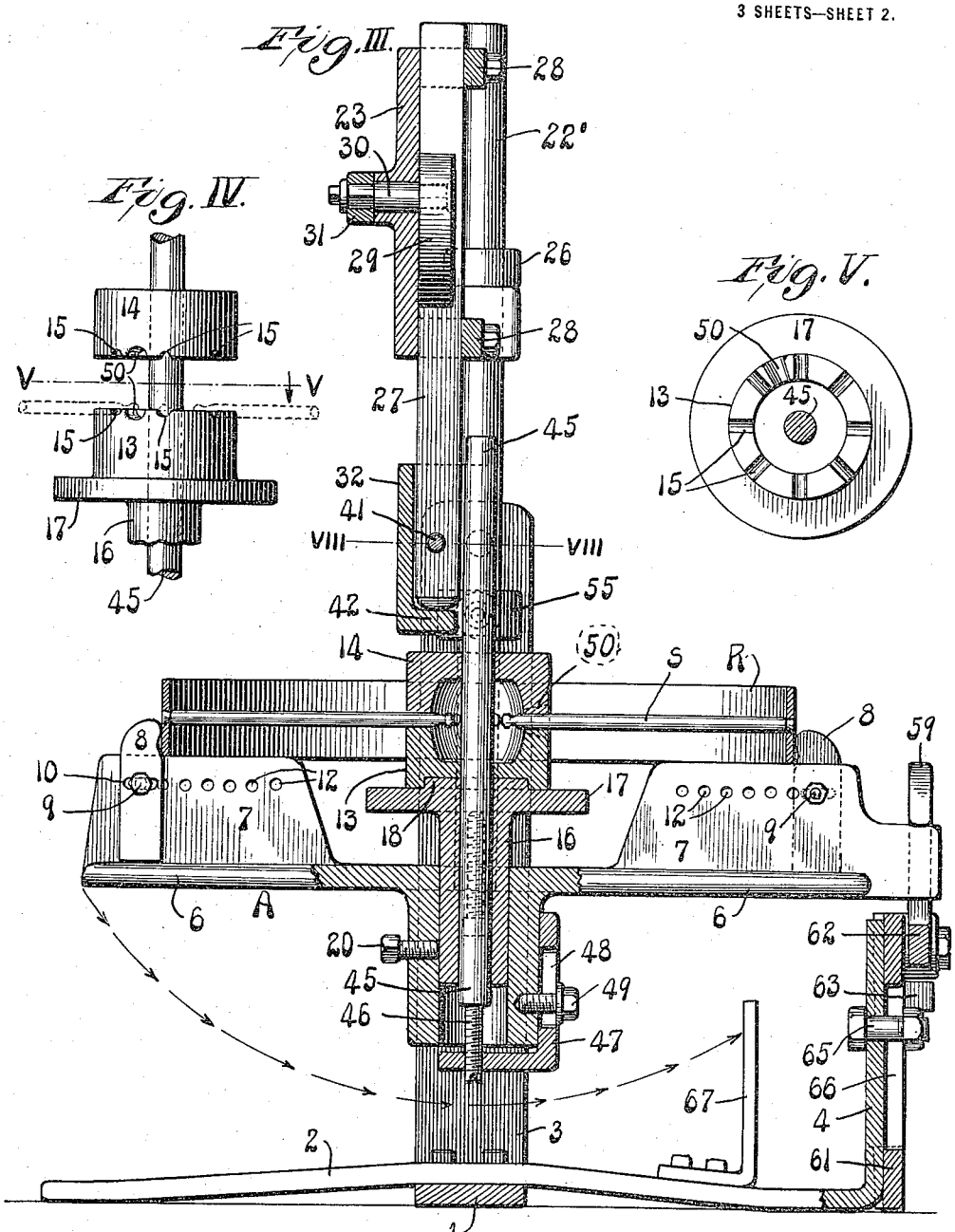

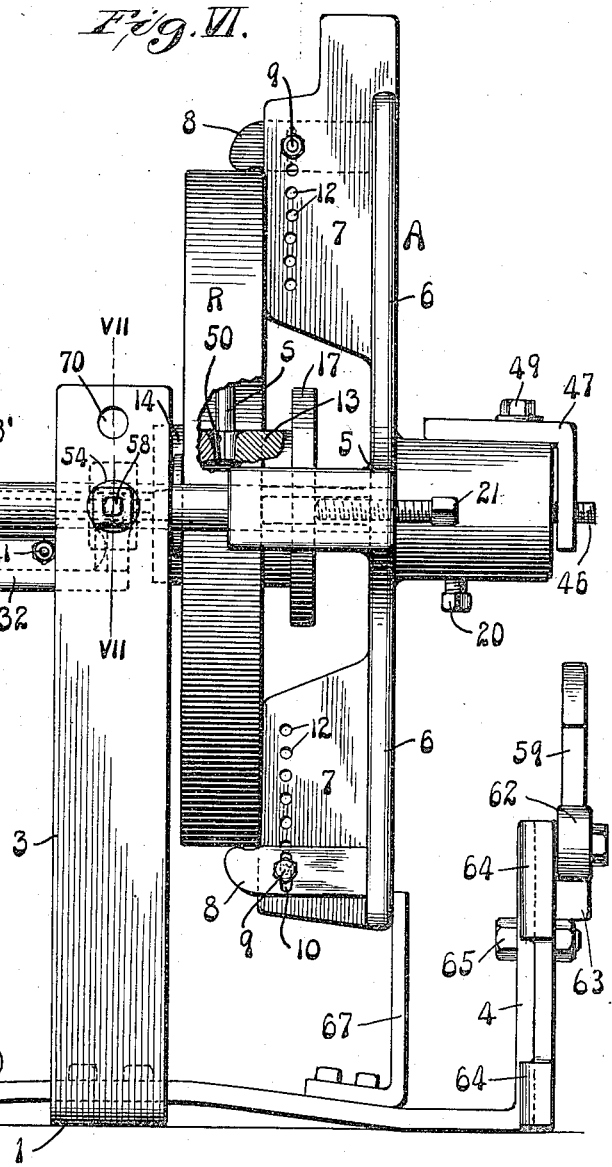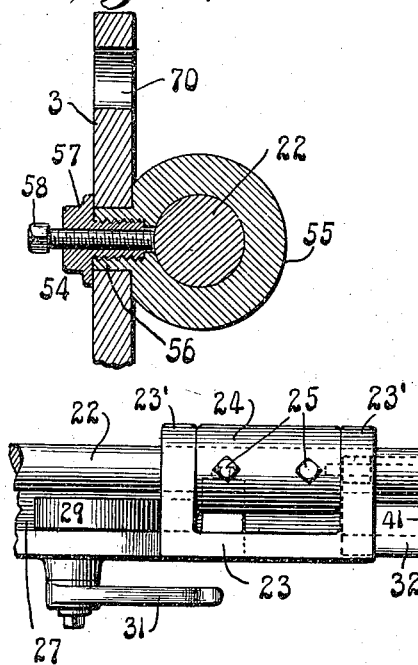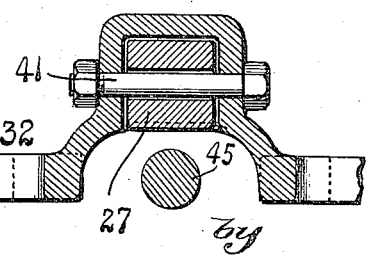

UNITED STATES PATENT OFFICE.

WILLIAM A. DENNEY, OF QUINCY, ILLINOIS, ASSIGNOR TO J. R. LITTLE METAL WHEEL COMPANY, A CORPORATION OF ILLINOIS.

WHEEL-FORMING MACHINE.

1,164,172.        Specification of Letters Patent.        Patented Dec. 14, 1915.

Application filed September 4, 1915. Serial No. 48,992.

*To all whom it may concern:*

Be it known that I, WILLIAM A. DENNEY, a citizen of the United States of America, a resident of Quincy, in the county of Adams, State of Illinois, have invented certain new and useful Improvements in Wheel-Forming Machines, of which the following is a full, clear, and exact description, reference being had to the accompanying drawings, forming a part of this specification.

My invention relates to improvements in wheel forming machinery, one of the objects being to produce an improved means for truing the spokes and rim of a wheel before the hub is applied to the spokes.

Another object is to provide an improved hub forming device in the form of a mold adapted to be secured to the wheel spokes and adapted to receive molten metal which is poured into the mold to form the hub of the wheel.

The invention also includes certain specific details of construction which will be hereinafter described.

Briefly stated, the machine I have shown to illustrate the preferred form of my invention, comprises a wheel support provided with means for centering the wheel structure, a spoke truing device arranged at the center of the wheel, and a pressing device for clamping the wheel rim to said wheel support, at the same time operating said spoke truing device to adjust the spokes with respect to the wheel rim. The wheel structure to be operated upon consists of a metallic wheel rim and spokes secured at their outer ends to said wheel rim. The inner ends of the spokes are free and they must be adjusted to predetermined positions with respect to the wheel rim. In accordance with the preferred form of my invention the unfinished wheel structure is placed upon the wheel support, and spoke truing dies are arranged on opposite sides of the spokes. These dies are preferably cored to form a mold for the wheel hub and the free inner ends of the spokes are arranged within said mold. After the wheel has been placed upon the wheel support with its spokes arranged between the dies the pressing device is operated to clamp the wheel rim onto the wheel support, and also to force one of the dies toward the other. The spokes are thus clamped between the dies which adjust them to their proper positions with respect to the wheel rim. Molten metal is then poured into the dies to form the wheel hub, and thereafter the dies are separated from each other and the wheel is removed from the wheel holder.

Figure I is a top or plan view of a machine embodying the features of my invention. Fig. II is a front elevation of the machine. Fig. III is an enlarged vertical section taken approximately on the line III—III, Fig. II. Fig. IV is a detail view showing the pair of dies, the upper portion of the die support, and the core which passes through the dies. Fig. V is a horizontal section taken on the line V—V, Fig. IV. Fig. VI is an enlarged side elevation showing the wheel holder in the position it occupies when the molten metal is poured into the dies. Fig. VII is an enlarged vertical section taken approximately on the line VII—VII, Fig. VI. Fig. VIII is an enlarged horizontal section taken approximately on the line VIII—VIII, Fig. III.

The machine I have shown to illustrate the preferred form of my invention comprises a main support having base members 1 and 2, arms 3 extending upwardly from the base member 1, and an arm 4 extending upwardly from the base member 2. A designates a wheel support or wheel holder, which is preferably a substantially X-shaped member having arms 5 and 6, each of said arms being provided with a flange 7 which constitutes a seat for the rim of the wheel structure. The means for centering the wheel on the wheel support comprises fingers 8 secured to the flanges 7 by means of bolts 9 each of which passes through a slot 10 in one of the fingers 8 and also through one of the flanges 7. The centering fingers 8 may be accurately adjusted by loosening the nuts on bolt 9 and shifting the fingers toward and away from the axis of the wheel, and to provide for greater range of adjustment, each flange 7 is preferably provided with a row of apertures 12 adapted to receive a bolt 9.

The wheel structure includes a metallic rim R and spokes S secured at their outer ends to said rim. The rim R resting upon the wheel support, is confined between the centering fingers 8 and the inner ends of the spokes are confined between a lower die 13 and an upper die 14, each of said dies being provided with notches 15 for the reception of the spokes. The means for supporting the lower die comprises a tubular stem 16, Fig. III, having a flange 17 at its upper end. The bottom face of the lower die 13 is recessed to receive a boss 18 on the flange 17. Before placing the wheel structure upon the wheel support the lower die is placed upon and interlocked with the boss 18 so as to positively lock said die in its proper position. The unfinished wheel structure is then placed upon the wheel support with its spokes above the lower die as shown in Fig. III, and the upper die 14 is placed over the free end portions of the spokes to confine the latter between the dies. A pressing device, which will be hereinafter described, is forced into engagement with the wheel rim to firmly clamp said rim onto the wheel support, and thereafter forced into engagement with the upper die to adjust the spokes between the dies.

The machine is intended to be used in finishing wheels having hubs and rims of various different dimensions, and the die support is therefore adjustably secured to the wheel holder.

The stem 16 of the die support is slidably fitted to the wheel holder as shown most clearly in Fig. III, and a horizontal set screw 20 passing through a portion of the wheel holder bears against the tubular stem 16. The die holder is also prevented from moving downwardly by vertical abutment screws 21 passing through the arms 5 of the wheel holder (Fig. II) and bearing against the bottom face of the flange 17 at the upper end of the die holder. These vertical screws 21 positively prevent the die holder from moving downwardly when the upper die is forced onto the lower die.

Vertical posts 22 and 22' are secured to the arms 5 of the wheel holder, and an arm 23 is fitted to the upper portions of these posts. A long set collar 24 is adjustably secured to the post 22 by means of set screws 25 (Fig. II) and one end of the arm 23 is provided with pivot ears 23' which surround the post 22 and which are fitted to the ends of the set collar 24. The arm 23 is thus pivotally connected at one end to the post 22, and its free end is bifurcated to receive the post 22'. A set collar 26 adjustably secured to rod 22' lies directly above the free end of arm 23 so as to prevent said free end from moving upwardly.

A pressing device carried by the pivoted arm 23 comprises a vertical thrust bar 27 fitted to guides 28. The rear face of the thrust bar is notched to receive an eccentric 29 which may be oscillated to raise and lower the thrust bar. A shaft 30, secured to the eccentric 29, is provided with an operating handle 31. A presser frame 32, secured to the lower end of the thrust bar 27 and arranged over the wheel structure, is provided with rigid abutments 33 adapted to engage the upper die 14 and yieldable rim pressers 34 adapted to engage the wheel rim. Obviously the presser frame 32 may be shifted toward and away from the wheel by rocking the operating handle 31.

Each rim presser 34 comprises a stem 35 and a head 36 at the lower end of said stem. The presser frame is provided with series of apertures 37 forming guideways for the stems 35 of the rim pressers. It will be noted that the guideways 37 are so formed that the rim pressers may be adjusted toward and away from each other to coöperate with rims of different dimensions. Springs 38 surrounding the stems 35 bear against set collars 39, the latter being adjustably secured to the stems by means of set screws 40. When the presser frame is elevated the springs 38 force the set collars 39 into engagement with the presser frame, the downward movement of the rim pressers being limited by said set collars.

When the presser frame is forced downwardly the rim pressers 34 engage the rim of the wheel before the rigid abutments 33 engage the upper die 14. The rim is firmly forced into engagement with the wheel holder and the upper die is then operated to adjust the spokes with respect to the rim. The object in firmly holding the rim before the spokes are adjusted is to insure the required relative adjustments by forcing the rim to a precise predetermined position before the spokes are clamped between the upper and lower dies. Since the machine is intended to receive wheels having rims and hubs of different dimensions, it is an advantage to adjustable secure the rim pressers to the set collars 39. The rim pressers may be adjusted vertically by loosening the set collars 39 and raising or lowering the rim pressers with respect to the set collars. By combining the yieldable rim pressers with the rigid abutments 33 I produce a pressing device which will positively engage the wheel rim before engaging the spoke truing device, and a high degree of accuracy is not necessary in the construction and arrangement of the yielding rim pressers.

The lower end of the vertical thrust bar 27 is loosely connected to the presser frame 32 by means of a bolt 41 secured to the presser frame and loosely fitted to the thrust bar 27, see Figs. II, III and VIII. The convex lower end of the thrust bar 27 rests upon an abutment 42 and the downward pressure of the thrust bar is transmitted to the presser frame through the abutment 42, instead of being transmitted through the bolt 41. Owing to the peculiar connection between the thrust bar and presser frame, the latter is free to oscillate and adjust itself on the wheel rim and on the upper die 14, thereby compensating for irregularities in the machine structure or wheel structure. The arm 23 serving as a carrier for the pressing device is prevented from moving upwardly by the set collars 24 and 26, and these set collars may be adjusted on the rods 22 and 22'.

When the pressing device is in service it occupies the position shown in the drawings, and when not in service it may be shifted away from the wheel structure by rocking the arm 23 about the axis of the post 22 so as to permit the removal of the wheel from the machine.

The metal dies 13 and 14 are preferably cored to form molds for the hub of the wheel, and a core member 45 is preferably arranged at the center of the dies. While any suitable core may be utilized, I have shown a metallic core member 45 adapted to be permanently secured to the hub so as to form the axle or journals of the wheel. The core 45 passes through the tubular stem 16 of the die support and rests upon a vertical screw 46 (Fig. III) which may be accurately adjusted to fix the position of the core. The vertical screw 46 is fitted to an adjustable angle bar 47, provided with a slot 48 for the reception of a screw 49, the latter being screwed into the wheel holder.

In the manufacture of wheels having metal cores it is desirable to pour the molten metal through a sprue 50 formed between the adjacent edges of the upper and lower dies, and the machine is therefore constructed to permit the wheel to be shifted from the horizontal position shown in Fig. III to the vertical position shown in Fig. VI. When the wheel occupies the last mentioned position it is securely held by the pressing devices and molten metal may be readily poured through the sprue 50 so as to completely fill the hollow dies. The adjacent edges of the dies are not closely or accurately fitted to each other, and air and other gases may escape between these edges during the casting operation. It is to be understood, however, that the dies are not so widely separated that the molten metal will escape between them.

The wheel holding devices, including the pressing device, are supported by the vertical posts 22 and 22', and to permit all of these devices to swing from the position shown in Fig. III to the position shown in Fig. VI, the vertical posts are connected to the main support by means of pivot devices 54. Each of these pivot devices comprises a collar 55 fitted to one of the vertical posts, a pivot pin 56 extending from said collar and pivotally mounted in the side frame (Fig. VII), a screw 57 fitted to the pivot pin, and a set screw 58 securing the collar 55 to the vertical rod. In moving to the position shown in Fig. VI, the wheel holding devices turn about the axis of the pivot pins 56.

The means for latching the wheel holder in the position shown in Figs. II and III comprises a pawl 59 pivoted at 60 to a plate 61. A weighted arm 62, forming part of the pawl 59, tends to drop by gravity, thereby holding the pawl in engagement with the wheel holder. 63 is a stop lug for limiting the movement of the pawl. Since the wheel holding devices are adjustably secured to the pivot members by the set screws 58, the pawl holding plate 61 is also adjustably supported. Guide lugs 64, formed on the pawl holder 61, are slidably fitted to the edges of the vertical arm 4, and said pawl holder is adjustably secured to said arm by means of a bolt 65 passing through a slot 66. After the wheel structure has been firmly clamped in position, the pawl 59 is released from the wheel holder to permit the latter to swing about the axis of the pivot pins to the position shown in Fig. VI. The wheel holder is then engaged with a stop member 67. The overhanging weight of the presser frame and the arm 23 tends to retain the wheel holder in engagement with the stop member 67 so that it is not necessary to lock the wheel holder in the position seen in Fig. VI. After the hub has been formed by pouring molten metal through the sprue 50, Fig. VI, the wheel holding devices are restored to the position shown in Fig. III. The pressing device is released from the upper die and wheel rim, and then swung about the axis of the vertical post 22, to permit the removal of the wheel and the dies. The latter are thereafter knocked from the wheel hub.

The wheel holding devices are adjustably supported by the collars 55 on posts 22 and 22', and a further adjustment may be obtained by placing the pivot pins 56 in the holes 70 near the upper ends of the vertical members 3.

I claim:—

1. A wheel forming machine comprising a wheel holder adapted to receive the rim of a wheel, dies adapted to receive the inner end portions of the spokes of the wheel, and means for moving one of said dies toward another so as to adjust the spokes with respect to the rim of the wheel.

2. A wheel forming machine comprising a wheel holder, means for securing the rim of a wheel to said wheel holder, and a spoke truing device adapted to adjust the spokes of a wheel while its rim is firmly secured to said holder, said spoke truing device including a pair of dies adapted to receive the inner end portions of the spokes, and means for moving one of said dies toward the other to clamp the spokes between them.

3. A wheel forming machine comprising a wheel holder, means for securing the rim of a wheel to said wheel holder, a pair of dies adapted to receive the spokes of the wheel, and means for moving one of said dies toward the other to clamp the spokes between them, thereby adjusting the spokes with respect to the rim.

4. A wheel forming machine comprising a support adapted to receive the rim of a wheel, opposing spoke truing members adapted to engage the wheel spokes at points near the center of the wheel, a pressing device adapted to engage the wheel rim and adapted to actuate one of said spoke truing members, and means for operating said pressing device so as to force the wheel rim onto said support, at the same time adjusting the spokes with respect to said rim.

5. A wheel forming machine comprising a wheel support adapted to receive the rim of the wheel, a spoke truing device operable to adjust the spokes of the wheel with respect to the rim of the wheel, and a pressing device having an abutment coöperable with said spoke truing device and provided with yieldable presser members which engage the rim of the wheel to force it onto said wheel support.

6. A wheel forming machine comprising a wheel support adapted to receive the rim of the wheel, a spoke truing device operable to adjust the spokes of the wheel with respect to the rim of the wheel, and a pressing device having an abutment coöperable with said spoke truing device and provided with yieldable presser members which engage the rim of the wheel to force it onto said wheel support, said yieldable presser members being arranged to engage the rim of the wheel before said abutment engages the spoke truing device.

7. A wheel forming machine comprising a wheel support adapted to receive the rim of a wheel, a spoke truing device operable to adjust the spokes of the wheel, a pressing device including a holder having an abutment adapted to coöperate with said spoke truing device and yieldable presser members slidably fitted to said holder, said yieldable presser members being adapted to engage the rim of the wheel before said abutment engages the spoke truing device, and stop members for limiting the movement of said yieldable presser members in one direction.

8. A wheel forming machine comprising a wheel support adapted to receive the rim of a wheel, a spoke truing device operable to adjust the spokes of the wheel, a pressing device including a holder having an abutment adapted to coöperate with said spoke truing device and yieldable presser members slidably fitted to said holder, said yieldable presser members being adapted to engage the rim of the wheel before said abutment engages the spoke truing device, and stop members for limiting the movement of said yieldable presser members in one direction, said stop members being adjustably fitted to said yieldable presser members.

9. A wheel forming machine comprising a wheel support adapted to receive the rim of a wheel, a spoke truing device arranged to lie near the center of the wheel, and operating mechanism including presser members adapted to force the rim of the wheel into engagement with said wheel support, said presser members being adjustable toward and away from the axis of the wheel.

10. A wheel forming machine comprising a wheel support adapted to receive the rim of a wheel, a spoke truing device arranged to lie near the center of the wheel, and operating mechanism including a pressing device having a holder and a plurality of rim pressers slidably fitted to said holder, said holder being provided with rows of guideways for the reception of said rim pressers so that the latter may be adjusted toward and away from the axis of the wheel.

11. A wheel forming machine comprising a wheel support adapted to receive the rim of a wheel, and means for adjusting the spokes of the wheel with respect to said rim, said means including a carrier, and a pressing device carried by said carrier, said carrier being movable to shift the pressing device away from the wheel.

12. A wheel forming machine comprising a wheel support adapted to receive the rim of a wheel, and means for adjusting the spokes of a wheel while its rim is resting on said wheel support, said means including a pressing device and a carrier supporting said pressing device, said carrier being arranged to support the pressing device at a point above the wheel and being movable to carry the pressing device away from the wheel so as to permit the removal of the wheel from said wheel support.

13. A wheel forming machine comprising a wheel support adapted to receive the rim of a wheel, means for adjusting the spokes of the wheel while its rim is resting on said wheel support, said means including a pivotally supported carrier and a pressing device carried by said carrier, said carrier being movable about its axis to carry the pressing device away from the wheel, thus permitting the removal of the wheel from said wheel support.

14. A wheel forming machine comprising a wheel support adapted to receive the rim of a wheel, posts secured to said wheel support, a carrier pivoted to one of said posts and adapted to engage the other post, the last mentioned post being provided with an abutment adapted to engage the free end of the carrier, and means for adjusting the spokes of the wheel while its rim is resting on said wheel support, said means including a pressing device carried by said carrier, the carrier being movable about its axis to carry the pressing device away from the wheel, thereby permitting the removal of the wheel from said wheel support.

15. A wheel forming machine comprising a wheel support adapted to receive the rim of a wheel, a die holder comprising a tubular member arranged to lie below the central portion of the wheel and adjustably fitted to said wheel support, a lower die resting upon said die holder, an upper die arranged above the lower die, and means for operating said upper die to adjust the spokes between said dies.

16. A wheel forming machine comprising a wheel support adapted to receive the rim of a wheel, a die holder comprising a member having a stem provided with a flange at its upper end, a horizontal set screw fitted to the stem of said die holder and vertical set screws arranged below said flange to prevent the die holder from moving downwardly, a lower die resting on said die holder, an upper die arranged above said lower die, and means for operating said upper die to adjust the spokes between said dies.

17. A wheel forming machine comprising a wheel support adapted to receive the rim of a wheel, a spoke truing device arranged to lie near the center of the wheel, a pressing device including rim pressers for forcing the rim of the wheel into engagement with said wheel support and an abutment adapted to engage the spoke truing device; and a thrust member for operating said pressing device to secure the wheel structure to said wheel support and to adjust the wheel spokes with respect to said pressing device, said thrust member being loosely fitted to said pressing device so as to allow the pressing device to adjust itself on the wheel rim and spoke truing device.

18. A wheel forming machine comprising a wheel support, a spoke truing device arranged to lie near the center of the wheel structure, and a pressing device including rim pressers adapted to engage the rim of the wheel to force it into engagement with said wheel support and also including an abutment adapted to engage the spoke truing device, a thrust member one end of which bears against the middle portion of said pressing device, a connecting member loosely securing said thrust member to said pressing device, and means for operating said thrust member.

19. A wheel forming machine comprising a wheel support adapted to receive the rim of a wheel, a spoke truing device operable to adjust the wheel spokes with respect to the wheel rim, posts secured to said wheel support, an arm arranged to lie over the wheel and adjustably fitted to said posts, said arm being adjustable toward and away from the wheel, a pressing device arranged between said adjustable arm and the wheel and adapted to engage the wheel rim and spoke truing device, and a thrust member connecting said pressing device to said adjustable arm.

20. A wheel forming machine comprising a wheel support adapted to receive the rim of a wheel, a pair of hollow dies arranged to lie near the center of the wheel and adapted to form a mold for the hub of the wheel, and means for moving one of said dies toward the other to close the die structure and to adjust the spokes between the dies.

21. A wheel forming machine comprising a main support, a pair of dies arranged to lie on opposite sides of the spokes at a point near the center of the wheel, means for moving one of said dies toward the other to close the die structure and to adjust the spokes between the dies, said dies being cored to form a mold for the hub of the wheel, and said wheel support being pivoted to said main support, so that the wheel structure secured to the wheel support may be shifted from a horizontal position to a vertical position.

22. A wheel forming machine comprising a main support, a wheel support pivoted to said main support, hub-forming dies carried by said wheel support and arranged to receive the inner ends of the wheel spokes, a pressing device carried by said wheel support and adapted to clamp the wheel rim and the hub-forming dies to said wheel support, the said wheel support being movable to carry the wheel structure from a horizontal position to a vertical position, and the hub-forming dies being adapted to receive molten metal when the wheel structure occupies the last mentioned position.

23. A wheel forming machine comprising a main support, a wheel support pivoted to said main support, hub-forming dies carried by said wheel support and arranged to receive the inner ends of the wheel spokes, a pressing device carried by said wheel support and adapted to clamp the wheel rim and the hub-forming dies to said wheel support, the said wheel support being movable to carry the wheel structure from a horizontal position to a vertical position, and the hub-forming dies being adapted to receive molten metal when the wheel structure occupies the last mentioned position, and a latch for holding the wheel support when it is positioned to hold the wheel in a horizontal position.

24. A wheel forming machine comprising a main support, a wheel support pivoted to said main support, hub-forming dies carried by said wheel support and arranged to receive the inner ends of the wheel spokes, a pressing device carried by said wheel support and adapted to clamp the wheel rim and the hub-forming dies to said wheel support, the said wheel support being movable to carry the wheel structure from a horizontal position to a vertical position, and the hub-forming dies being adapted to receive molten metal when the wheel structure occupies the last mentioned position, a latch for holding the wheel support when it is positioned to hold the wheel in a horizontal position, and a stop member for limiting the movement of said wheel support when it is shifted to carry the wheel structure to its vertical position.

WILLIAM A. DENNEY.

In the presence of—
OLIVER B. WILLIAMS,
WILLIAM H. GOVERT.

Copies of this patent may be obtained for five cents each, by addressing the "Commissioner of Patents, Washington, D. C."